(12) United States Patent
Moehlmann et al.

(10) Patent No.: US 7,410,438 B2
(45) Date of Patent: Aug. 12, 2008

(54) SWITCHING-VALVE ARRANGEMENT FOR A SHIFTING SYSTEM OF AN AUTOMATIC TRANSMISSION

(75) Inventors: Reinhard Moehlmann, Köln (DE); Martin Leibbrandt, Bedburg (DE)

(73) Assignee: Getrag Ford Transmissions GmbH, Cologne (DE)

( * ) Notice: Subject to any disclaimer, the term of this patent is extended or adjusted under 35 U.S.C. 154(b) by 254 days.

(21) Appl. No.: 11/398,194

(22) Filed: Apr. 5, 2006

(65) Prior Publication Data

US 2006/0234826 A1 Oct. 19, 2006

(30) Foreign Application Priority Data

Apr. 7, 2005 (EP) ................... 05102756

(51) Int. Cl.
*F16H 31/00* (2006.01)
(52) U.S. Cl. ............ 475/116; 475/127; 192/3.58; 192/86; 192/87.13; 192/87.14; 192/87.18
(58) Field of Classification Search ............ None
See application file for complete search history.

(56) References Cited

U.S. PATENT DOCUMENTS

| | | | |
|---|---|---|---|
| 3,747,439 A | 7/1973 | Uozumi et al. | |
| 4,186,627 A | 2/1980 | Kuramochi | |
| 4,198,022 A | 4/1980 | Pletcher et al. | |
| 4,349,088 A | 9/1982 | Ito et al. | |
| 4,445,393 A | 5/1984 | Braun | |
| 4,462,280 A | 7/1984 | Sugano et al. | |
| 5,044,216 A * | 9/1991 | Steeby et al. | ............... 74/335 |
| 6,658,951 B2 * | 12/2003 | Harries | ............... 74/336 R |
| 6,712,725 B2 * | 3/2004 | Uchino | ............... 475/119 |
| 2006/0046897 A1* | 3/2006 | Mohlmann et al. | ............... 477/143 |

FOREIGN PATENT DOCUMENTS

| | | |
|---|---|---|
| DE | 101 34 115 | 1/2003 |
| EP | 0 294 033 | 12/1988 |

OTHER PUBLICATIONS

Office Action issued by the EPO dated Oct. 2, 2007 for EP Application 05 102 756.3.
English translation of Office Action issued by the EPO dated Oct. 2, 2007 for EP Application 05 102 756.3.

* cited by examiner

*Primary Examiner*—David D. Le
(74) *Attorney, Agent, or Firm*—Alexander R. Schlee

(57) ABSTRACT

The invention relates to a switching-valve arrangement for a shifting system of an automatic transmission having a first actuator for engaging and releasing gears, at least a second actuator for engaging and releasing gears, a first activatable switching valve, a second activatable switching valve, a first signal element, and a second signal element. By means of the signal elements and switching valves the first and second actuators can be pressurized. In case of failure of one of the signal elements one of the actuators can always be pressurized and even in case of erroneous operation of the first and second signal elements only one of the actuators can be pressurized at the same time.

14 Claims, 1 Drawing Sheet

SWITCHING-VALVE ARRANGEMENT FOR A SHIFTING SYSTEM OF AN AUTOMATIC TRANSMISSION

This application claims the priority of the European Patent Application EP 05102756.3 having a filing date of Apr. 7, 2005, the entire content of which is herewith incorporated by reference.

BACKGROUND OF THE INVENTION

The invention relates to a switching-valve arrangement for a shifting system of an automatic transmission, in particular for a shifting system of a dual clutch transmission, which has a first actuator and at least a second actuator for engaging or releasing gears.

DE 101 34 115 discloses a hydraulic control arrangement for controlling a dual clutch transmission which has a plurality of gears and a plurality of actuators for engaging and releasing the gears. The hydraulic control arrangement can be divided up here into a first and second partial circuit.

A first switching valve is provided between the first partial circuit and a pressure line, the switching valve, in a first position, separating the first partial circuit from the pressure line and, in a second position, connecting it to the pressure line. By virtue of the first switching valve being subjected to a first switching force by a valve-activating means, the first switching valve is moved from the first position into the second position counter to the force of a spring. It is thus possible to connect a first actuator within the first partial circuit to the pressure line via the first switching valve. If the switching force is reduced or set to zero, the spring forces the switching valve back into its first position.

Furthermore, a second switching valve is provided between the second partial circuit and the pressure line, this second switching valve, like the first switching valve, in a first position, setting the second partial circuit to a pressureless state and, in a second position, connecting the second partial circuit to the pressure line. Here too, a valve-activating means provides a switching force, a second switching force, in order to move the switching valve into the second position counter to the force of a spring. A second actuator of the dual clutch transmission, which in this case is to be assigned to the second partial transmission, can thus be connected to the pressure line.

Consequently, the two partial circuits can be set to a pressureless state and/or subjected to pressure by the first and the second switching valves. The two switching valves are switched by valve-activating means which are independent of one another. In the event of a valve-activating means for one switching valve failing, this independent activation may result in the two actuators being subjected to pressure simultaneously. In respect, for example, of the switching valves of DE 101 34 115, which are designed as electrically activated magnetic switching valves, this would be the case when, as a result of error, one of the two switching valves is permanently activated and the other switching valve switches as envisaged. However, irrespective of the way in which the hydraulic control arrangement according to DE 101 34 115 is actually divided up, error-induced simultaneous pressure activation of actuators of a shifting system can, in the case of dual clutch transmissions, result in serious damage. If, for example, the first actuator and the second actuator are assigned to a partial transmission of a dual clutch transmission, and if these two actuators are subjected to pressure simultaneously, it would be possible for two gears to be engaged simultaneously in this partial transmission.

It would indeed be possible for one switch-over valve, instead of the two switching valves, to be switched upstream of the actuators, this switch-over valve, in a first position, connecting the first actuator to the pressure line and, in a second position, connecting the second actuator to the pressure line. This rules out the situation where the two actuators are subjected to pressure simultaneously. On the other hand, if use is made of this switch-over valve, it would always be the case that one actuator is subjected to pressure, and this would be associated with certain leakage-related losses. It is indeed possible to provide upstream of the switch-over valve, in turn, a switching valve which, as has already been described above, separates the downstream actuators from the pressure line as required. If, however, this switching valve fails, for example if it cannot any longer be moved into the position in which it connects the pressure line to the actuators, it is no longer possible for the downstream actuators to operate any gears. This would possibly mean, in the case of a dual clutch transmission in a motor vehicle, that it is no longer possible to engage starting gears.

SUMMARY OF THE INVENTION

The object of the invention is thus to provide a switching-valve arrangement for a shifting system of an automatic transmission which comprises a first and a second switching valve preventing the simultaneous actuation of 2 actuators, but in the event of an individual error occurring, allows at least reliable emergency operation of the automatic transmission.

This is achieved in that for pressurizing the actuators a prioritizing valve system is used as for instance known from U.S. Pat. No. 4,186,627, U.S. Pat. No. 3,747,439, EP 0 294 033 or U.S. Pat. No. 4,349,088 for changing over the actuating pressure between 2 brakes, wherein a coupling is provided between the first and the second switching valves and transmits the first switching force to the second switching valve at least in part, the force which results from the first and the second switching forces and acts on the second switching valve being insufficient to retain the second switching valve in its second position or to force it into its second position. According to the present invention, the valve system is only used for crossing over a controlled pressure; consequently, the design can be simplified significantly. Therefore, in combination with the downstream switching valve it can be provided that only one actuator is pressurized with hydraulic oil, and even in case of failure of one control valve one actuator can always be actuated.

If, in the case of the control arrangement according to the invention, the first switching valve is subjected to the first switching force, the first switching valve switches into its second position and subjects the first actuator to pressure. At the same time, as a result of the coupling between the first and second switching valves, this first switching force also acts on the second switching valve. Since the force which results from the first and second switching forces is no longer sufficient to switch the second switching valve out of its first position, the first switching valve constitutes an effective barrier for the second switching valve. The barrier prevents the first and second actuators from being subjected to pressure simultaneously, even when the two switching valves—as a result of a control error—are subjected to the respective switching force simultaneously.

The second switching valve, in addition, is forced out of the second position as soon as the first switching valve is activated by the first switching force. The first switching valve thus does not just act as a barrier; it also forces the second switching valve out of its second position, even when the second switching force is active. This gives clear prioritization: if the two switching valves, as a result of error, are activated simultaneously or the respective switching forces are active, the first switching valve is located in its second position and allows a connection between the first actuator and the pressure line. In the case of a dual clutch transmission for a motor vehicle, this first actuator can preferably serve for engaging at least one starting gear. If the error of first and second switching forces being active simultaneously occurs, the motor vehicle can still be moved.

The respective second positions of the first and second switching valves are preferably spring-loaded. In order to switch from the first position into the second position, it is necessary to overcome a force of a spring. The spring, in addition, forces the relevant switching valve back into the first position of the switching valve again if it is not prevented from doing so by the corresponding switching force of the switching valve. In the case of the control arrangement according to the invention, a spring and the first and second switching forces thus act on the second switching valve.

In order to force the second switching valve out of its second position, the sum of the first switching force and spring force has to be greater than the second switching force, the first switching force and the spring force acting in the same direction and being set counter to the second switching force.

In a preferred exemplary embodiment, the first switching force acting on the second switching valve is greater than the second switching force. Irrespective of any spring, the second switching valve is always forced into its first position, or retained in this position, as soon as the first switching force is active and is transmitted by the coupling. The first switching force is preferably approximately twice the magnitude of the second switching force, with the result that the second switching valve is reliably forced into its first position even when the second switching force is set.

The coupling between the first and second switching valves may be mechanical or else, for example, hydraulic.

The coupling preferably comprises a spring, the spring, in a rest position, forcing the switching valves into their respective first positions. The spring is intended to be located in its rest position if neither the first nor the second switching force are active. The spring may be arranged between the first and the second switching valves, and it is compressed when one switching force and/or the other act/acts on the switching valves. The spring transmits the first switching force of the first switching valve to the second switching valve here. Correspondingly, the second switching force is also transmitted to the first switching valve.

In a preferred exemplary embodiment, the coupling between the first and the second switching valves rules out the situation where the two switching valves simultaneously assume a second position in each case by form fitting. For example in the exemplary embodiment in which a spring is arranged as a coupling between the switching valves, this can be achieved in that the spring is compressed to the full extent when one of the two switching valves is located in its second position. This makes it even less likely for the first and second actuators to be subjected to pressure simultaneously.

The first and/or second switching valve may each be assigned a signal element for generating a signal pressure for building up the respective switching force, it preferably being possible for the signal element to be actuated electro-mechanically. By virtue of a current being applied to the signal element, the latter provides a signal pressure which actuates the corresponding switching valve hydraulically. It is also possible, however, for the first and the second switching valves to be directly activated electrically.

In a preferred exemplary embodiment, the signal pressure of the signal element of the first switching valve corresponds to the signal pressure of the signal element of the second switching valve. It is thus possible for identical signal elements to be connected to an identical pressure line in each case, this simplifying the construction of the shifting system.

The effective surface area of a piston of the first switching valve, this piston being subjected to the signal pressure, may be greater than an effective surface area of a piston of the second switching valve, this piston being subjected to the signal pressure. An appropriate design of the surfaces makes it possible to set a desired ratio between the first and second switching force. The effective surface area of the piston of the first switching valve is expediently double the size of the corresponding surface area of the second switching valve. If identical signal pressures exist in each case, this gives a ratio of 2:1 between the first switching force and second switching force.

The first or the second switching valve may be designed as a 3/2-way valve. The 3/2-way switching valve here has two inlets and an outlet. One inlet connects the switching valve to the pressure line, while the other inlet connects the switching valve to an oil sump or the like. The outlet connects the switching valve directly or indirectly, via further valves, to the associated actuator.

BRIEF DESCRIPTION OF THE DRAWINGS

The invention is explained in more detail with reference to the exemplary embodiment illustrated in FIG. 1.

DETAILED DESCRIPTION OF THE DRAWINGS

Figure 1:
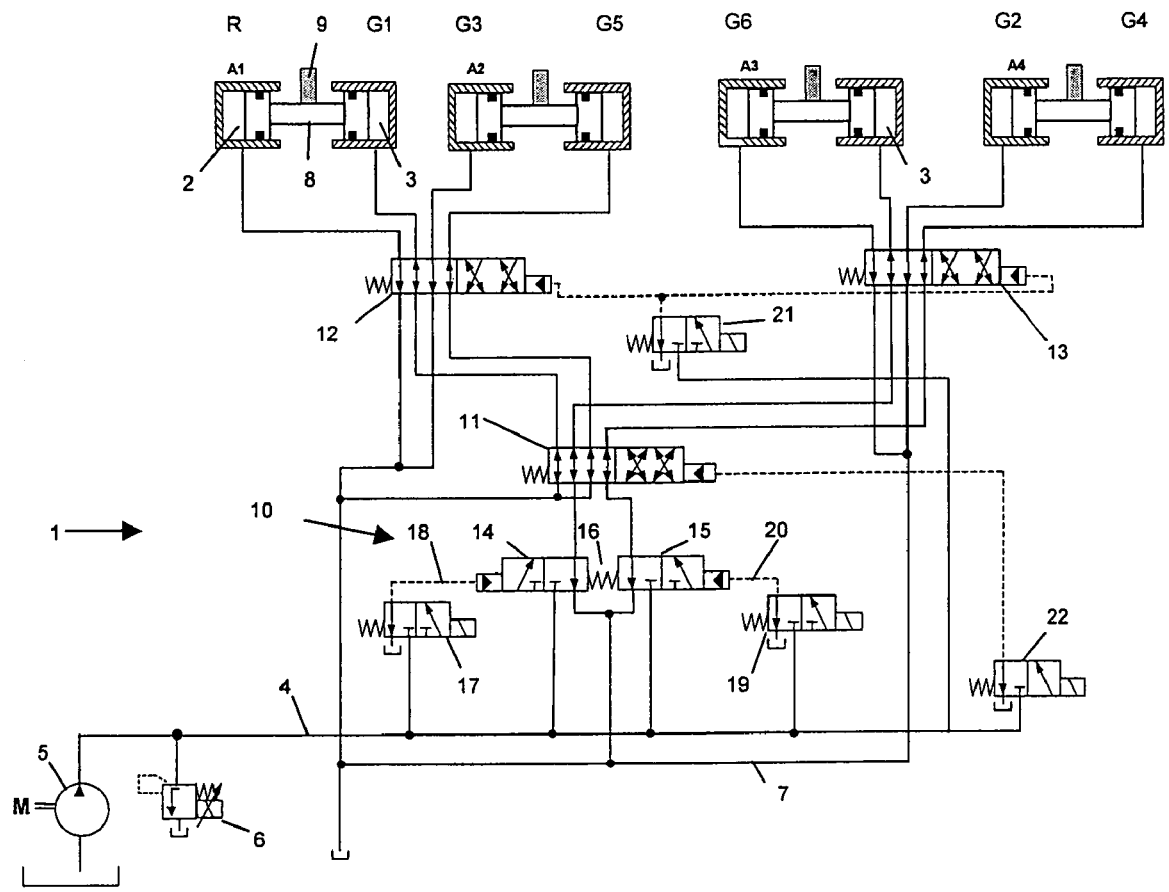

FIG. 1 shows a shifting system, designated 1, of an automatic transmission having four actuators A1, A2, A3, A4, which are each designed as shifting cylinders which can be activated on two sides. A shifting cylinder A1, A2, A3, A4 has, in each case, a first chamber 2 and a second chamber 3, which can be connected, via the shifting system 1, to a pressure line 4, depending on the position of the individual components of the shifting system. A motor-driven pump 5 and a pressure regulator 6 provide for regulated pressure in the pressure line 4. Furthermore, with appropriate positioning of the individual components, the shifting system 1 connects the chambers 2, 3 of the actuators A1 to A4 to an oil-sump line 7, in order for it to be possible for these to be set to a pressureless state.

If, for example, the second chamber 3 of the actuator A1 is subjected to the regulatable pressure in the pressure line 4 and, at the same time, the first chamber 2 of the actuator is set to a pressureless state, a double piston 8 shifts, in the illustration of FIG. 1, to the left. With the aid of a shifting fork 9 (only indicated in FIG. 1) which is fastened to the double piston 8, a reverse gear R is engaged. If, in contrast, the double piston 8 is moved to the right in the illustration of FIG. 1, the first forward gear G1 of the automatic transmission is engaged. That position of the double piston 8 which is illustrated in FIG. 1 corresponds to a neutral position of the shifting fork 9.

Just as the reverse gear R and the first gear G1 can be engaged by actuator A1, so can the other gears G2 to G6 be shifted via the other actuators A2 to A4. The way in which actuator and gear are assigned to each other can be gathered from FIG. 1.

The shifting system 1 comprises a switching-valve arrangement 10 for selecting an actuator, a group-selecting valve 11, and two chamber-selecting valves 12 and 13. With the aid of the group-selecting valve 11, either the group with the actuators A1 and A2 or the group with the actuators A3 and A4 is selected. On account of the valve arrangements 10, 11 and 12 and 13 being connected in series, it is possible to select a certain chamber of an actuator, with the result that a pressure medium with a moderated pressure can be channeled into this chamber from the pressure line 4.

The switching-valve arrangement 10 comprises a first switching valve 14 and a second switching valve 15. Arranged between the valves 14, 15 is a spring 16 which has one end supported on the first switching valve 14 and another end supported on the second switching valve 15. The spring 16 forces the two switching valves into a respective first position, as is illustrated in FIG. 1. In that position of the switching-valve arrangement 10 which is illustrated in FIG. 1 (the two switching valves 14, 15 are located in their first position in each case), the chambers 2, 3 of all the actuators and the group-selecting valve 11 and the chamber-selecting valves 12, 13 are switched to a pressureless state.

The first switching valve 14 is assigned an electromagnetically actuatable signal element 17. In the activated state (the non-activated state is illustrated in FIG. 1), the signal element 17 provides, via the signal line 18, a signal pressure by means of which the first switching valve 14 can be switched from the first position, which is illustrated here, into a second position. In this second position, the first switching valve 14 connects the pressure line 4 to the group-selecting valve 11, as a result of which, in the case of those positions of the valves 11 and 13 which are illustrated here, the second chamber 3 of the actuator A3 would be subjected to pressure.

As is the case with the first switching valve 14, the second switching valve 15 is also assigned an electromagnetically actuatable signal element 19, which is connected to the second switching valve 15 via a signal line 20. In the activated state, the signal element 19 opens and channels pressure from the pressure line 4 to the switching valve 15, which switches from a first position (first position illustrated in FIG. 1) into a second position, the possibility of this switching operation depending on the position of the first switching valve 14.

Similarly, it is also the case that the chamber-selecting valves 12, 13 and the group-selecting valve 11 are each assigned a signal element for generating a signal pressure. A signal element 21 is provided upstream of the chamber-selecting valve 12 and a signal element 22 is provided upstream of the group-selecting valve 11. The signal elements 17, 19, 21 and 22 are each designed as electromagnetically actuatable 3/2-way switching valves.

The signal pressure in the signal line 18 generates a first switching force, which, in the exemplary embodiment shown, is intended to be twice the magnitude of a second switching force, which stems from the signal pressure from the signal line 20. The ratio of the switching forces in relation to one another here can be set via differently sized surface areas of the switching valves 14, 15, on which signal pressures act in each case.

In the respectively first position of the two switching valves 14, 15, as has already been mentioned above, the shifting system 1 with the actuators A1 to A4 is set to a pressureless state. This allows leakage-related losses to be minimized. If, then, the signal element 17 is activated, the first switching valve 14 is forced into its second position, the spring 16 being compressed simultaneously. On account of the first switching valve 14 and spring 16 being connected in series, the spring 16 is compressed by the first switching force, frictional forces which act on the first switching valve 14 being disregarded. The spring 16 thus pushes, by way of this first switching force, against the second switching valve 15 and retains it in its first position. Since the second switching force is half the magnitude of the first switching force transmitted by the spring, the second switching valve remains in its first position even when the associated signal element 19 opens. It is only when the signal element 17 closes and the control pressure in the signal line 18 and thus the first switching force are correspondingly reduced that the second switching valve 15 can be pushed, by the second switching force, into its second position.

If, in contrast, the second switching valve is located in its second position, and if the first switching valve is then subjected to the first switching force, the first switching valve is pushed into its second position, irrespective of whether the movement is countered by the second switching force, since the first switching force is greater than the second switching force.

Simultaneous activation of the two signal elements 17, 18 thus always results in defined positioning of the switching-valve arrangement. On account of the priority given to the first switching valve 14, it is possible, in the case of simultaneous activation of the two signal elements 17, 18, for either the actuator A1 or the actuator A3 to be actuated, depending on the position of the group-selecting valve 11. The possibility of actuating the actuator A1 allows the reverse gear R and the first forward gear to be engaged. It would thus still be possible to move a motor vehicle which is equipped with the shifting system 1.

Even if one of the signal elements 17, 19 cannot be opened any longer, however, (emergency) operation of the motor vehicle is possible. If, for example, no signal pressure can be built up in the signal line 18, the second switching valve 15 can be switched back and forth without any restrictions, as a result of which it is optionally possible to set the shifting system 1 to a pressureless state or to select one of the actuators A2 and A4 for pressure activation.

LIST OF REFERENCE NUMBERS

1 Shifting system
2 First chamber
3 Second chamber
4 Pressure line
5 Pump
6 Pressure regulator
7 Oil-sump line
8 Double piston
9 Shifting fork
10 Switching-valve arrangement
11 Group-selecting valve
12 Chamber-selecting valve
13 Chamber-selecting valve
14 First switching valve
15 Second switching valve
16 Spring
17 Signal element
18 Signal line
19 Signal element
20 Signal line
21 Signal element
22 Signal element
A1 to A4 Actuator
G1 to G6 Forward gear
R Reverse gear

The invention claimed is:

1. A switching-valve arrangement for a shifting system of an automatic transmission having a first actuator for engaging and releasing gears, at least a second actuator for engaging and releasing gears,
a first activatable switching valve,
a second activatable switching valve,
a first signal element, and
a second signal element, wherein
by means of the first activatable switching valve, in a first position, the first actuator can be set to a pressureless state and, in a second position, the first actuator can be subjected to pressure, a first switching force being provided by the first signal element for switching the valve from the first position into the second position and for retaining it in the second position, and
by means of the second activatable switching valve, in a first position, the second actuator can be set to a pressureless state and, in a second position, the second actuator can be subjected to pressure, a second switching force being provided by the second signal element for switching the valve from the first position into the second position and for retaining it in the second position, wherein
in case of failure of one of the signal elements one of the actuators can always be pressurized and even in case of erroneous operation of the first and second signal elements only one of the actuators can be pressurized at the same time.

2. The switching valve arrangement as claimed in claim 1, wherein the pressurizable actuator is provided for switching into at least one starting gear.

3. The switching-valve arrangement as claimed in claim 1, wherein at least one of the switching valves is designed as a 3/2-way switching valve.

4. The switching valve arrangement of claim 1, wherein a coupling is provided between the first switching valve and the second switching valve, said coupling transmitting at least a part of the first switching force to the second switching valve, the resulting force acting on the second switching valve being insufficient to retain the second switching valve in its second position or to force it into its second position.

5. The switching-valve arrangement as claimed in claim 4, wherein the first switching force is greater than the second switching force, preferably approximately twice the magnitude.

6. The switching-valve arrangement as claimed in claim 4, wherein the coupling is mechanical.

7. The switching-valve arrangement as claimed in claim 4, wherein the coupling comprises a spring that, in a rest position, forces the switching valves into their respective first position.

8. The switching-valve arrangement as claimed in claim 4, wherein the coupling between the first and second switching valves prevents in a form-fitting manner that the first and second switching valves can simultaneously assume a second position.

9. The switching-valve arrangement as claimed in claim 4, wherein the first and the second signal elements are electromagnetic signal elements.

10. The switching-valve arrangement as claimed in claim 4, wherein the respective second position of the first and second switching valves is spring-loaded.

11. The switching-valve arrangement as claimed in claim 4, wherein the first and the second signal elements are pressure valves.

12. The switching-valve arrangement as claimed in claim 11, wherein the signal pressure of the signal element of the first switching valve equals the signal pressure of the signal element of the second switching valve.

13. The switching-valve arrangement as claimed in claim 11, wherein an effective surface area of a piston pressurized with the signal pressure of the first switching valve is greater than an effective surface area of a piston pressurized with the signal pressure of the second switching valve.

14. The switching-valve arrangement as claimed in claim 13, wherein the effective surface area of the piston of the first switching valve is approximately double the size of the effective surface area of the piston of the second switching valve.

* * * * *